United States Patent [19]

Harms et al.

[11] Patent Number: 4,568,742
[45] Date of Patent: Feb. 4, 1986

[54] BASIC TRIPHENDIOXAZINE DYESTUFFS

[75] Inventors: Wolfgang Harms, Leverkusen; Günter Franke, Leichlingen, both of Fed. Rep. of Germany; Edgar Siegel, deceased, late of Leverkusen, Fed. Rep. of Germany, by Gabriele E. H. Siegel, heiress

[73] Assignee: Bayer Aktiengesellschaft, Leverkusen, Fed. Rep. of Germany

[21] Appl. No.: 669,191

[22] Filed: Nov. 7, 1984

[30] Foreign Application Priority Data

Nov. 19, 1983 [DE] Fed. Rep. of Germany ....... 3341886

[51] Int. Cl.⁴ ................... C07D 498/04; C09B 19/00
[52] U.S. Cl. ........................................ 544/76; 544/77
[58] Field of Search .................................. 544/76, 77

[56] References Cited

U.S. PATENT DOCUMENTS

| 2,763,641 | 9/1956 | Seitz et al. | 544/76 X |
| 2,954,378 | 9/1960 | Pugin et al. | 544/76 |
| 3,883,523 | 5/1975 | Parton | 544/76 |
| 3,996,221 | 12/1976 | Leng et al. | 544/75 X |
| 4,092,478 | 5/1978 | Plant et al. | 544/76 |
| 4,336,377 | 6/1982 | Adam et al. | 544/74 |
| 4,440,504 | 8/1983 | Harms et al. | 544/76 |
| 4,472,575 | 9/1984 | Renfrew | 544/76 |

FOREIGN PATENT DOCUMENTS 101665 2/1984 European Pat. Off. .

Primary Examiner—Richard L. Raymond
Attorney, Agent, or Firm—Sprung Horn Kramer & Woods

[57] ABSTRACT

Basic triphendioxazine dyestuffs of the formula

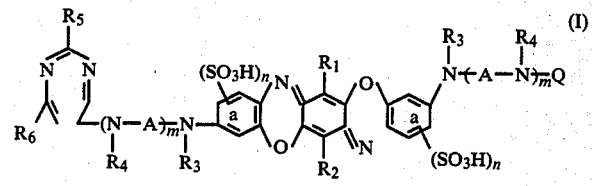

wherein
Q denotes the radical

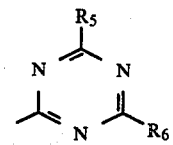

or hydrogen,
$R_1$ and $R_2$, independently of each other, denote hydrogen, halogen, alkyl, aryl, alkoxy, aryloxy, CN, $CONH_2$, CONH—alkyl, CON(alkyl)$_2$, CONH—aryl, COO—alkyl, NH—CO—alkyl or NH—CO—aryl and
$R_3$ and $R_4$, independently of each other, each denote hydrogen or alkyl, or
$R_3$ and $R_4$ are joined together into a ring,
A denotes a divalent hydrocarbon radical which is optionally interrupted by oxygen or sulphur,
$R_5$ denotes a radical of a polyamine which can be protonated or quaternized,
$R_6$ is defined the same way as $R_5$ or denotes $NH_2$, NH—alkyl, N(alkyl)$_2$, wherein the two alkyl radicals can be joined together to form a ring, NH—cyclohexyl, NH—aryl, N(alkyl)—aryl, NH—aralkyl, N(alkyl)-aralkyl, OH, alkoxy, aryloxy, alkyl or aryl,
m denotes 0 or 1 and
n denotes 0–2 with the proviso that n is less than the total number of protonatable or quaternizable nitrogen atoms in $R_5$ and $R_6$,
and wherein said cyclic and acyclic substituents can in turn be substituted by nonionic or cationic radicals customary in dyestuff chemistry, are used in particular for dyeing paper.

4 Claims, No Drawings

BASIC TRIPHENDIOXAZINE DYESTUFFS

The present invention relates to basic triphendioxazine dyestuffs of the formula

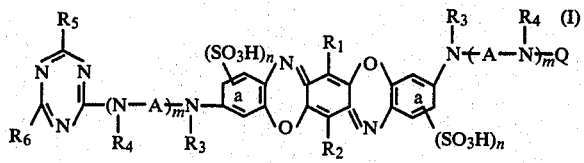

wherein

Q denotes the radical

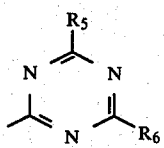

or hydrogen, $R_1$ and $R_2$, independently of each other, denote hydrogen, halogen, alkyl, aryl, alkoxy, aryloxy, CH, $CONH_2$, CONH—alkyl, CON(alkyl)$_2$, CONH—aryl, COO—alkyl, NH—CO—alkyl or NH—CO—aryl and $R_3$ and $R_4$, independently of each other, each denote hydrogen or alkyl, or $R_3$ and $R_4$ are joined together into a ring, A denotes a divalent hydrocarbon radical which is optionally interrupted by oxygen or sulphur, $R_5$ denotes a radical of a polyamine which can be protonated or quaternised, $R_6$ is defined the same way as $R_5$ or denotes $NH_2$, NH—alkyl, N(alkyl)$_2$, wherein the two alkyl radicals can be joined together to form a ring, NH—cyclohexyl, NH—aryl, N(alkyl)—aryl, NH—aralkyl, N(alkyl)—aralkyl, OH, alkoxy, aryloxy, alkyl or aryl, m denotes 0 or 1 and n denotes 0–2, and wherein said cyclic and acyclic substituents can in turn be substituted by nonionic, cationic or anionic radicals customary in dyestuff chemistry, and the rings a can be substituted by nonionic radicals customary in dyestuff chemistry, with the proviso that the total number of anionic groups is less than the total number of protonatable or quaternisable nitrogen atoms in $R_5$ and $R_6$, to their preparation, to their aqueous solutions and to their use for dyeing cationically dyeable substrates, in particular paper.

For the purposes of the present invention, an optionally protonated or quaternised polyamine radical $R_5$ is preferably a diamine, triamine or tetramine radical and in particular a radical of the formulae

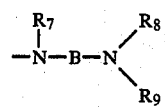

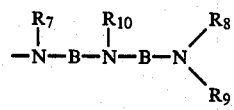

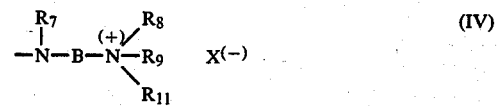

and

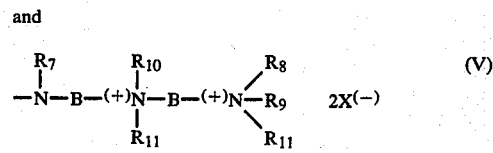

wherein $R_7$–$R_{10}$ each denote hydrogen or alkyl and $R_{11}$ denotes hydrogen, alkyl or aralkyl, or $R_7$ and $R_8$ or $R_7$ and $R_{10}$ or $R_8$ and $R_{10}$ or $R_8$ and $R_9$ or $R_8$, $R_9$ and $R_{11}$ are joined together to form a ring, B represents optionally branched $C_2$–$C_6$-alkylene, cyclohexylene, phenylene or a radical of the formulae

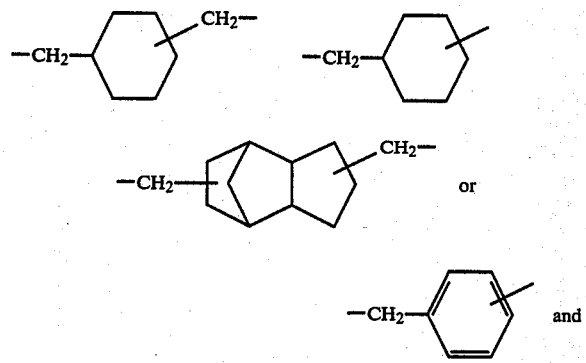

$X^{(-)}$ represents an anion, and wherein the said cyclic and acyclic radicals can in turn be substituted by nonionic or cationic radicals customary in dyestuff chemistry.

In the formula (I), $R_1$ and $R_2$ each preferably represent halogen and in particular chlorine.

In the formulae (I)–(V), an alkyl radical is to be understood as meaning, above all, a radical having 1–4 carbon atoms.

Aryl and aralkyl preferably represent phenyl and benzyl or phenylethyl respectively.

Examples of nonionic substituents which come into consideration are halogen, such as fluorine, chlorine, or bromine, hydroxyl, $C_1$–$C_4$-alkoxy, cyano, $C_1$–$C_4$-alkyl and amino.

The cationic substituent in question is especially the ammonium group and the anionic substituent the sulphato group.

However, nonionic and cationic substituents are preferred. The radical A represents, for example, optionally branched alkylene having 2–6 C atoms which can be interrupted by O or S or be substituted by OH, or the radicals:

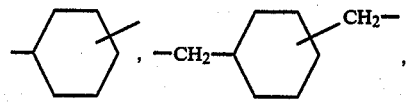

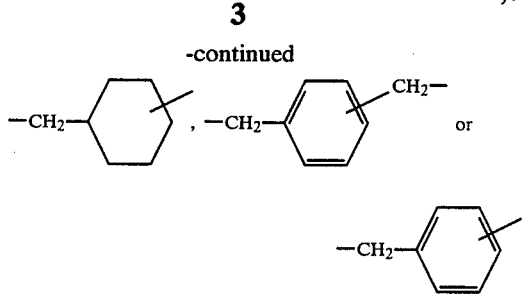

which can be substituted by $C_1-C_4$ alkyl.

The radicals $R_3$ and $R_4$, together with —N—A—N—,
$R_7$ and $R_8$, together with —N—B—N—,
$R_7$ and $R_{10}$, together with —N—B—N— or
$R_8$ and $R_{10}$, together with —N—B—N—, can form a 5- or 6-membered ring, for example a piperazine or imidazolidine ring.

The radicals $R_8$ and $R_9$ on the one hand and the radicals $R_8$, $R_9$ and $R_{11}$ on the other, together with N, can form a 5- or 6-membered ring, for example a piperidine, morpholine, piperazine or pyrrolidine ring and a pyridine ring respectively.

Said heterocyclic structures can carry further substituents, such as $C_1-C_4$-alkyl radicals, or a fused-on ring, for example a benzene ring.

Particular examples of anions $X^{(-)}$ are: chloride, bromide, iodide, sulphate, hydrogensulphate, methylsulphate, ethylsulphate, sulphamate, perchlorate, phosphate, hydroxide, formate, acetate, propionate, oxalate, malonate, succinate, maleinate, chloroacetate, trichloroacetate, methoxyacetate, ethoxyacetate, lactate, citrate, benzoate, methanesulphonate, ethanesulphonate, benzenesulphonate, p-toluenesulphonate and carbonate.

Examples of $R_1$ and $R_2$ are: hydrogen, chlorine, bromine, $C_1-C_4$-alkyl, phenyl, chlorophenyl, methylphenyl, $C_1-C_4$-alkoxy, acetylamino, propionylamino, butyrylamino, benzoylamino, methylbenzoylamino, chlorobenzoylamino, phenoxy, chlorophenoxy, methylphenoxy, anilinocarbonyl, toluidinocarbonyl, chloroanilinocarbonyl, methoxycarbonyl and ethoxycarbonyl.

Radicals $R_3$ and $R_4$, in addition to hydrogen, are for example $C_1-C_4$-alkyl, $\beta$-hydroxyethyl or $\beta$-sulphatoethyl.

Examples of alkylene radicals A are ethylene, 1,2-propylene, 1,3-propylene, 1,4-butylene, 1,3-butylene, 2,3-butylene, 2-methyl-1,3-propylene, 2-hydroxy-1,3-propylene, 1,5-pentylene, 1,6-hexylene, 2,5-hexylene, —CH$_2$—CH$_2$—O—CH$_2$—CH$_2$—, —CH$_2$—CH$_2$—S—CH$_2$—CH$_2$—, 2,2-dimethylpropylene, 2-methyl-2,4-pentylene, 1,2-, 1,3- and 1,4-cyclohexylene, 4-methyl-1,3-cyclohexylene.

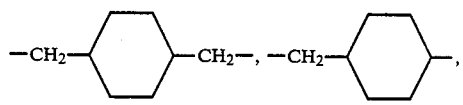

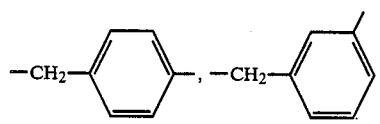

Examples of $R_5$ are: 2-dimethylamino-1-ethylamino, 2-diethylamino-1-ethylamino, 2-($\beta$-hydroxyethylamino)-1-ethylamino, 2-bis-($\beta$-hydroxyethyl)-amino-1-ethylamino, N-(2-dimethylamino-1-ethyl)-N-methylamino, 2-methylamino-1-ethylamino, N-(2-ethylamino-1-ethyl)-N-ethylamino, 3-dimethylamino-1-propylamino, 3-diethylamino-1-propylamino, 3-methylamino-1-propylamino, 3-ethylamino-1-propylamino, 3-($\beta$-hydroxyethylamino)-1-propylamino, 3-bis-($\beta$-hydroxyethyl)-amino-1-propylamino, 3-(N-methyl-N-$\beta$-hydroxyethyl)-amino-1-propylamino, 5-dimethylamino-2-pentylamino, 5-diethylamino-2-pentylamino, 2-amino-1-ethylamino, 3-amino-1-propylamino, 4-amino-1-butylamino, 5-amino-1-pentylamino, 6-amino-1-hexylamino, 3-amino-2-hydroxy-1-propylamino, 2-(N-morpholino)-1-ethylamino, 2-(N-piperazinyl)-1-ethylamino or N-(N'-2-aminoethyl)-piperazino, 2-[N-(N'-methyl)piperazinyl]-1-ethylamino, 2-(N-piperidinyl)-1-ethylamino, 3-(N-piperazinyl)-1-propylamino, or N-(N'-3-aminopropyl)-piperazino, 3-[N-(N'-methyl)-piperazinyl]-1-propylamino, 3-(N-morpholino)-1-propylamino, piperazinyl, N-methyl-N'-piperazinyl, N-ethyl-N'-piperazinyl, 3-(N-piperidinyl)-1-ethylamino, 3-(N-pyrrolidinyl)-1-propylamino, 2-(N-pyrrolidinyl)-1-ethylamino, N-($\beta$-hydroxyethyl)-N'-piperazinyl, 4-amino-1-cyclohexylamino, 3-amino-1-cyclohexylamino, 4-, 3- or 2-dimethylaminophenylamino, 4-($\beta$-diethylaminoethoxy)-phenylamino, 4-N-(3'-dimethylamino-1'-propylamino)-phenylamino, 4-N-(2'-dimethylamino-1'-ethylamino)phenylamino, 3-(N-methyl-N-$\gamma$-aminopropyl)-1-propylamino, and also the radicals of diethylenetriamine, triethylenetetramine, tetraethylenepentamine, pentaethylenehexamine, dipropylenetriamine, tripropylenetetramine and the radicals

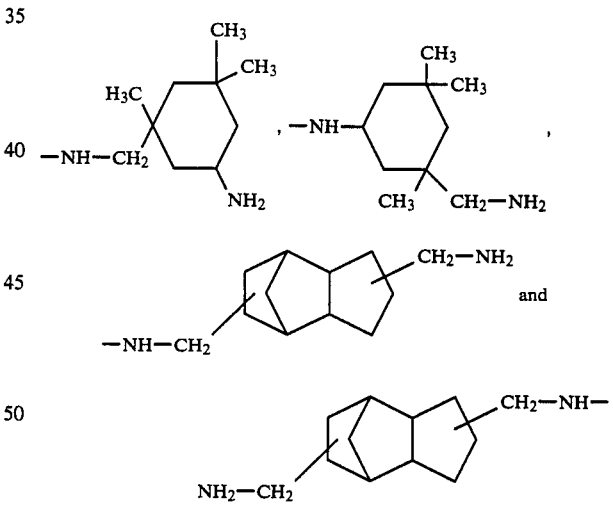

as well as the ammonium salts of these amines which carry as the fourth radical on the nitrogen for example a $C_1-C_4$-alkyl group, hydroxyethyl, hydroxypropyl, dihydroxypropyl, methoxycarbonylethyl or benzyl.

Examples of radicals $R_6$, in addition to $R_5$, are $NH_2$, OH, $C_1-C_4$-alkylamino, di-($C_1-C_4$-alkyl)-amino, $\beta$-hydroxyethylamino, bis-($\beta$-hydroxyethylamino), morpholino, piperidino, cyclohexylamino, benzylamino, N-methyl-N-benzylamino, N-methyl-N-($\beta$-hydroxyethyl)-amino, phenylamino, 2-, 3- or 4-methylphenylamino, 2-, 3- or 4-chlorophenylamino, 2-, 3- or 4-methoxyphenylamino, 2-, 3- or 4-acetylaminophenylamino, 2-, 3- or 4-benzoylaminophenylamino and 2-, 3- or 4-ureidophenylamino.

Preferred dyestuffs of the formula (I) have the formula

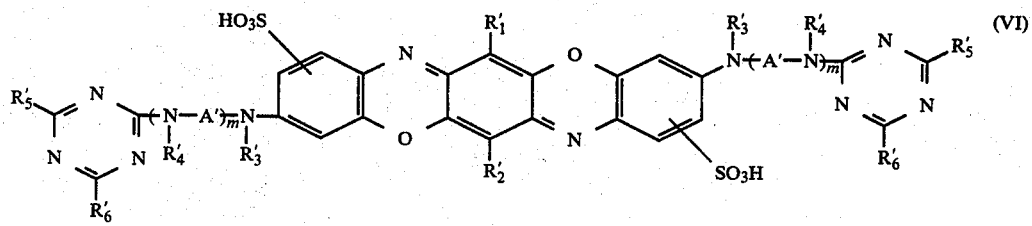

wherein
R'₁ and R'₂ each denote hydrogen or halogen,
R'₃ and R'₄ each denote hydrogen or C₁-C₄-alkyl which can be substituted by OH or sulphato,
A' denotes optionally branched C₂-C₆-alkylene which can be interrupted by O or S or be substituted by OH or the radicals

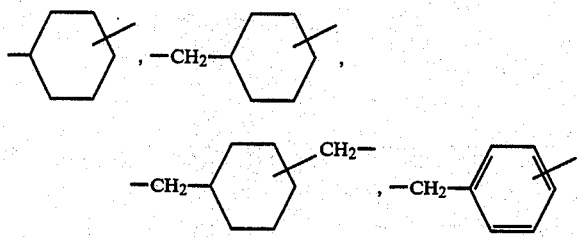

which can be substituted by C₁-C₄-alkyl, or

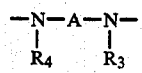

represents optionally C₁-C₄-alkyl-substitutable piperazine,
R'₅ denotes a radical of the formula

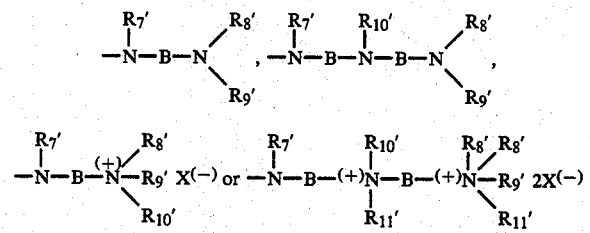

R'₇-R'₁₁ each denote hydrogen or C₁-C₄-alkyl which is optionally substituted by hydroxyl, C₁-C₄-alkoxy, halogen, cyano, C₁-C₄-alkoxycarbonyl or C₁-C₄-alkylcarbonyl and
R'₁₁ also denotes optionally C₁-C₄-alkyl-, hydroxyl-, C₁-C₄-alkoxy- or halogen-substituted benzyl or phenylethyl and B denotes C₂-C₆-alkylene, cyclohexylene, phenylene or an optionally C₁-C₄-alkyl-substituted radical of the formulae

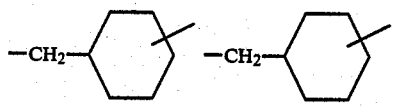

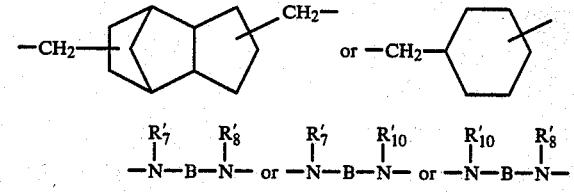

an optionally C₁-C₄-alkyl-substituted piperazine or imidazolidine ring, or
R'₈—N—R'₉ signifies an optionally C₁-C₄-alkyl-substituted piperidine, morpholine, piperazine or pyrrolidine ring or

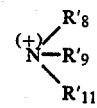

signifies an optionally C₁-C₄-alkyl-substituted pyridinium radical,
X⁽⁻⁾ signifies an anion,
R'₆ is defined in the same way as R'₅ or represents

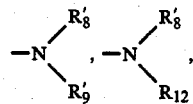

OR'₈ or OR₁₂ where R₁₂=optionally C₁-C₄-alkyl-, hydroxyl-, C₁-C₄-alkoxy- or halogen-substituted phenyl, benzyl, phenylethyl or cyclohexyl and m denotes 0 or 1.
In preferred dyestuffs of the formula (VI), R'₁ and R'₂ each represent chlorine, R'₃ and R'₄ each represent hydrogen or C₁-C₄-alkyl, and R'₆ represents R'₅.
Particularly noteworthy dyestuffs have the formula

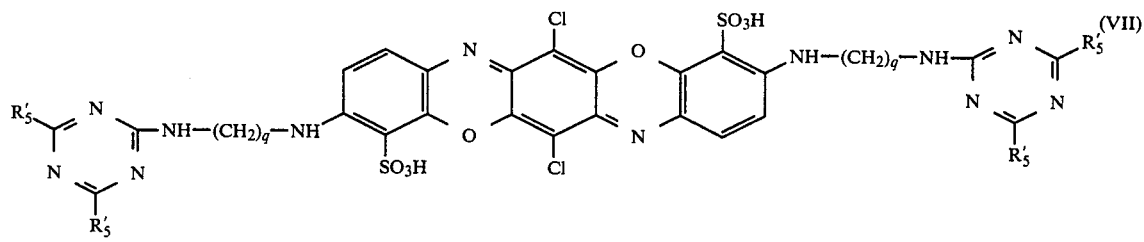

wherein
R'₅ is as defined above and
q represents 2, 3 or 4,
and the formula

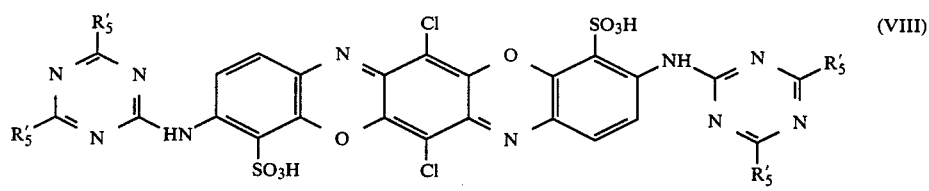

Of these, attention should in turn be drawn to those of the formula (VII) or (VIII) wherein
q represents 2 or 3,
R'₅ represents —NH—(CH₂)₃—N(R'₁₂)₂

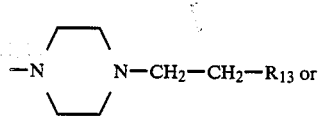

or

—NH—CH₂—CH₂—N⟨piperazine⟩N—R'₁₂

R'₁₂ represents hydrogen, methyl or ethyl and
R₁₃ represents OH or N(R'₁₂)₂, and in particular to their salts obtained by reaction with quaternising agents of the formula

R'₁₁—X  (IX)

wherein

R'₁₁ represents hydrogen, methyl or ethyl and
X represents a radical detachable in the form of an anion $X^{(-)}$.

Said dyestuffs (I) are prepared by condensing dyestuff bases of the formula

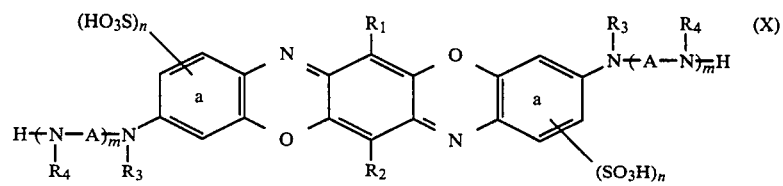

wherein
R₁, R₂, R₃, R₄, A, m and n are as defined above, with trihalogenotriazines of the formula

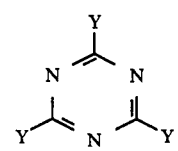

wherein
Y=F, Cl or Br,
to give compounds of the formula

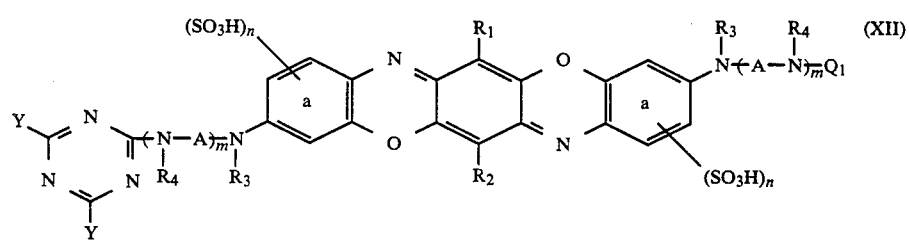

wherein
R₁, R₂, R₃, R₄, A, Y, m and n are as defined above and
Q₁ represents hydrogen or the radical

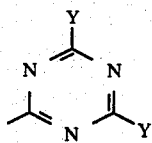

and by reacting these compounds further in any order—through elimination of hydrogen halide—with compounds of the formulae

   R$_5$—H   (XIII)

or with R$_5$—H and

   R$_6$—H   (XIV)

wherein

R$_5$ and R$_6$ are as defined above.

In an alternative method for compounds of the formula (I), dyestuff bases of the formula (X) are condensed with substituted dihalogenotriazines of the formula

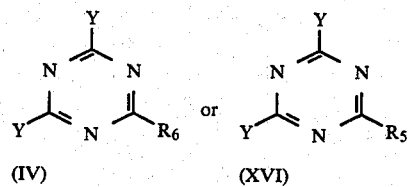

(IV)   (XVI)

wherein

R$_5$, R$_6$ and Y are as defined above, to give respectively compounds of the formulae

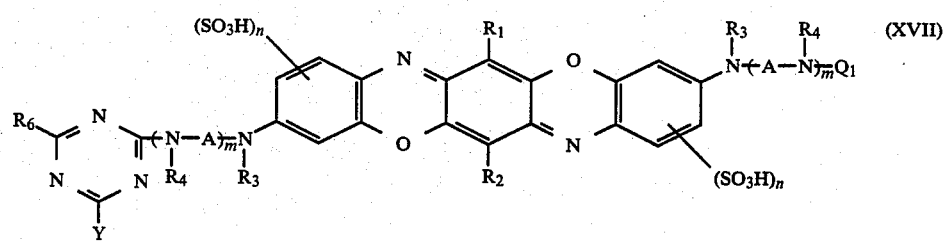 (XVII)

and

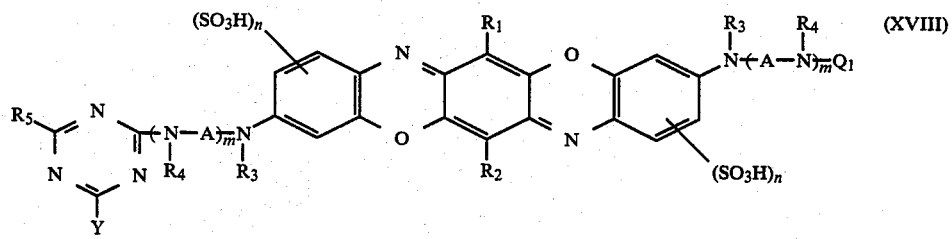 (XVIII)

wherein

R$_1$, R$_2$, R$_3$, R$_4$, R$_5$, R$_6$, A, Y, Q$_1$, m and n are as defined above, and these compounds are condensed with compounds of the formulae (XIII) and (XIV) respectively.

Triphendioxazine compounds of the formula (X) can be prepared, for example, by condensing substituted benzoquinones with optionally appropriately substituted 1,4-phenylenediamines or the sulphonic acids thereof and subsequently cyclising the condensation products obtained as described in German application Nos. DE-A-2,122,262, 2,124,080, 2,503,611 and 2,823,828. It is also possible to react nitroaminophenols with substituted benzoquinones, as is described in German Patent Specification No. 620,346, and to reduce the nitro groups in the resulting nitrotriphendioxazines to amino groups.

Said dyestuff bases (X) are condensed with said trihalogenotriazines (XI) at temperatures of 0°–40° C., preferably 0°–20° C., and pH 3–10 in aqueous or aqueous-organic media in the presence of alkaline condensing agents, such as aqueous alkali metal hydrogencarbonate, alkali metal carbonate, alkali metal hydroxide or alkali metal phosphate solution; or the condensation is carried out at temperatures of 0°–20° C. in aprotic organic solvents such as toluene, halogenobenzenes, nitrobenzene, dimethylformamide, N-methylpyrrolidone, tetramethylene sulphone, dimethyl sulphoxide, acetone or methylethylketone in the presence of aprotic organic bases, such as trialkylamines, N,N-dialkylanilines, pyridine or alkylpyridines.

The second halogen atom in compounds of the formula (XII) is generally replaced, depending on the nature of Y, at temperatures between 0°–60° C. and at pH 4–11, preferably pH 5–10. These conditions also apply to the condensation of dihalogenotriazine components (XV) and (XVI) with dyestuff bases (X).

The replacement of the third halogen atom, in order to arrive at compounds of the formula (I), can be obtained at temperatures between 30° and 100° which can be allowed for through appropriate temperature control if products of the formula (I) are to be prepared from compounds (XII).

The replacement of the third halogen atom in compounds (XII) or of the second and third halogen atoms in compounds (XVII) and (XVIII) can of course also be carried out in excess amounts of components (XIII) and (XIV) respectively in the presence or absence of water or organic solvents.

The basic dyestuffs obtained by the methods which have been demonstrated are made ready for application by dissolving them in the dilute acids either directly or, if necessary, after prior isolation, or they are quaternised with quaternising agents (IX) in water, aqueous-organic or organic solvents and optionally isolated for the purpose of subsequently preparing pure aqueous solutions.

The new basic dyestuffs can be used in protonated or quaternised form, when they are readily water-soluble, for dyeing, from aqueous solutions, a very wide variety of different materials, such as cellulose materials, polyacrylonitrile, acid-modified nylon and polyester, wool and leather.

The dyestuffs according to the invention are highly suitable above all for dyeing a very wide variety of different types of paper in bright blue to violet shades.

The degrees of exhaustion obtained on dyeing are high, as evidenced by the low concentration of dyestuff in the waste water. The dyeings have good to very good light and wet fastness properties. They are highly resistant to the action of water, alcohols, soaps or aqueous organic acids.

EXAMPLE 1

12.0 g of a triphendioxazine component of the formula

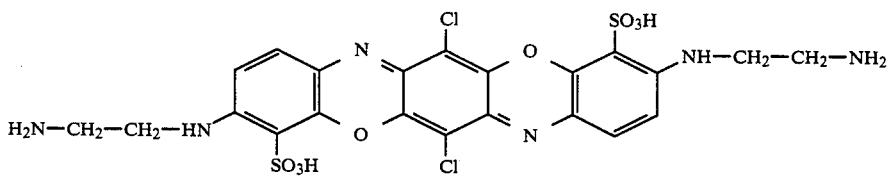

are dissolved at pH 11.5 in 180 ml of water. 120 ml of acetone are added, and the solution is brought to pH 10.5.

A solution of 8.4 g of cyanuric chloride in 80 ml of acetone is added to 80 g of ice. To the resulting cyanuric chloride suspension is added, dropwise, at 0° to 6° C. the solution of the triphendioxazine component while pH 8.5 is maintained by controlling the rate of dropwise addition and adding 1N sodium hydroxide solution. Stirring is continued for about a further 2 hours, until the condensation has ended. The condensation mixture is raised to room temperature, the condensation product is salted out with sodium chloride, the precipitate is filtered off with suction, and the filter cake is washed with 10% strength sodium chloride solution.

The product obtained is introduced into a solution of 29.0 g of 3-dimethylamino-1-aminopropane in 180 ml of water. The temperature is raised to 50° for 1 hour and then to 75° to 80° for a further 4 hours. The resulting solution is cooled down. The resulting product is precipitated by adding 25% strength sodium chloride solution and is filtered off with suction, and the filter cake is washed with 20% strength sodium chloride solution and then with 15% strength sodium chloride solution and is dried.

The result is a dyestuff of the formula (VII) in which $q=2$ and $R'_5=NH-CH_2-CH_2-CH_2-N_{(3)2}$
max=637 nm in 5% strength acetic acid.

To dye paper, the product is dissolved in 10% strength acetic acid. The papers dyed in bright blue shades have very good light fastness and excellent wet fastness properties. C.I. indicator number 14.

EXAMPLE 2

10.0 g of the triphendioxazine compound of the formula

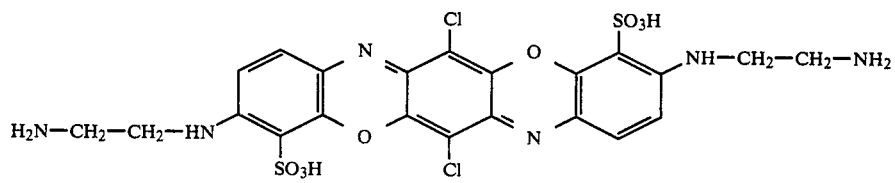

are dissolved in 400 ml of water by means of 34 ml of 1N sodium hydroxide solution. This solution is added dropwise at 0° to 5° to a suspension of 10.5 g of cyanuric chloride in 140 ml of water and 1.0 g of an emulsifier based on lauryl alcohol and ethylene oxide at such a rate as to establish pH 8.5–8.8. After all the solution has been dripped, in said pH is maintained further by the dropwise addition of 1N sodium hydroxide solution until the condensation is complete, which takes several hours. 20.0 g of 2-aminoethylpiperazine are then added to the finely dispersed suspension of the condensation product, and the mixture is initially heated at 60° for 2 hours and then at 95° for 5 hours. The mixture is cooled down, the partially precipitated product is salted out completely with sodium chloride and is filtered off with suction, and the filter cake is washed with concentrated sodium chloride solution and then with 10% strength sodium chloride solution.

The compound obtained has the formula (VII) where $q=2$ and $R'_5=$

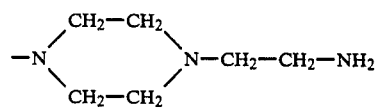

$\lambda_{max}$641 nm in 5% strength acetic acid.

The dyestuff is made ready for dyeing paper by dissolving it in dilute acetic acid. It produces on paper blue dyes having excellent fastness properties. High degrees of exhaustion are obtained on dyeing sized and unsized paper. C.I. indicator number 14.

EXAMPLE 3

12.0 g of the triphendioxazine component of Example 1 are reacted with 8.4 g of cyanuric chloride, and the bis-(dichlorotriazinyl) condensation product is then isolated as described there. The filter cake obtained is introduced into a mixture of 23.0 g of 2-hydroxyethylpiperazine and 250 ml of water. The mixture is heated initially at 50° for 1 hour and then at 95° to 100° for 3 hours. After the mixture has cooled down, the reaction product, which has partly crystallised out in the form of needles, is salted out as far as possible by the dropwise addition of 25% strength sodium chloride solution, is filtered off with suction, is washed with dilute sodium chloride solution and is dried.

The product obtained has the formula (VII) where q=2 and R'$_5$=

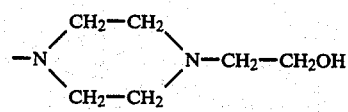

$\lambda_{max}$=635 nm in 5% strength acetic acid.

For the dyeing of paper, the product is dissolved in dilute acetic acid. This solution can be used to dye paper in brilliant neutral blue shades. The dyeings have excellent light fastness properties and good wet fastness properties. The slight discolouration of the waste water after the dyeing demonstrates the high affinity of the dyestuff for cellulose material. C.I. indicator number 15.

EXAMPLE 4

Example 2 is repeated, except that the triphendioxazine component used there is replaced by 10.4 g of the following compound

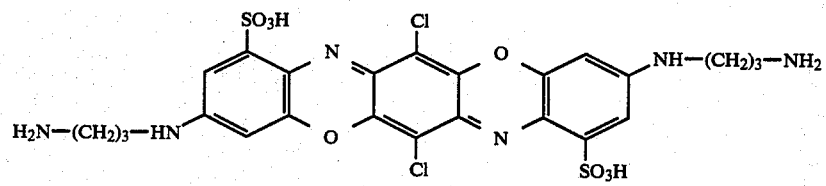

affording a product of the formula (III) where q=3 R'$_5$=

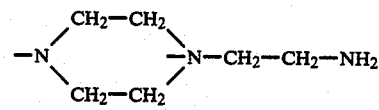

$\lambda_{max}$=639 nm in 5% strength acetic acid which is similarly used in a weakly acid solution for dyeing paper in bright blue shades. This product likewise produces excellent wet fastness properties on the dyed paper and high degrees of exhaustion. C.I. indicator number 14.

The triphendioxazine components listed in column 2 of Table I can be condensed analogously to Examples 1 to 3 with 2 moles of cyanuric chloride and the resulting intermediates can be reacted with 4 moles of the amine of column 3, the products being in every case basic blue dyestuffs of the formula (I) which are soluble in weak acids. C.I. indicator number 14.

TABLE I

| Example No. | Triphendioxazine component | Amine |
|---|---|---|
| 5 | H₂N—(CH₂)₂—HN—[aryl(SO₃H)]—O—[center: Cl, N, N, Cl]—O—[aryl(SO₃H)]—NH—(CH₂)₂—NH₂ | NH₂—(CH₂)₃—N(CH₃)—CH₂—CH₂OH |
| 6 | (same triphendioxazine as above) | NH₂—(CH₂)₃—N(CH₂—CH₂OH)₂ |
| 7 | (same triphendioxazine as above) | NH₂—(CH₂)₃—N(CH₂CH₂)₂O (morpholine) |
| 8 | (same triphendioxazine as above) | HN(CH₂CH₂)₂N—CH₃ (N-methylpiperazine) |
| 9 | (same triphendioxazine as above) | H₂N—(CH₂)₃—N(C₂H₅)₂ |

TABLE I-continued

| Example No. | Triphendioxazine component | Amine |
|---|---|---|
| 10 | [triphendioxazine with SO₃H, Cl, NH-(CH₂)₂-NH₂ substituents] | $NH_2-(CH_2)_3-\underset{\underset{CH_3}{\mid}}{N}-(CH_2)_3-NH_2$ |
| 11 | [triphendioxazine with SO₃H, Cl, NH-(CH₂)₂-NH₂ substituents] | $NH_2-(CH_2)_2-N(C_2H_5)_2$ |
| 12 | [triphendioxazine with SO₃H, Cl, NH-(CH₂)₂-NH₂ substituents] | $NH_2-(CH_2)_2-N(CH_2-CH_2OH)_2$ |
| 13 | [triphendioxazine with SO₃H, Cl, NH-(CH₂)₂-NH₂ substituents] | $NH_2-(CH_2-CH_2-NH)_2-CH_2-CH_2-NH_2$ |
| 14 | [triphendioxazine with SO₃H, Cl, NH-(CH₂)₂-NH₂ substituents] | [3-aminomethyl-3,5,5-trimethylcyclohexylamine structure] |

TABLE I-continued

| Example No. | Triphendioxazine component | Amine |
|---|---|---|
| 15 | [triphendioxazine with NH-(CH$_2$)$_2$-NH$_2$ and SO$_3$H substituents, Cl groups on central ring] | [tricyclic diamine with two CH$_2$-NH$_2$ groups] |
| 16 | [triphendioxazine with NH-(CH$_2$)$_2$-NH$_2$ and SO$_3$H substituents, Cl groups] | NH$_2$-(CH$_2$)$_3$-NH-CH$_3$ |
| 17 | [triphendioxazine with NH-(CH$_2$)$_2$-NH$_2$ and SO$_3$H substituents, Cl groups] | 3-(dimethylaminomethyl)aniline: phenyl with NH$_2$ and CH$_2$-N(CH$_3$)$_2$ |
| 18 | [triphendioxazine with NH-(CH$_2$)$_3$-NH$_2$ and SO$_3$H substituents, Cl groups] | NH$_2$-(CH$_2$)$_3$-N(CH$_3$)$_2$ |
| 19 | [triphendioxazine with NH-(CH$_2$)$_3$-NH$_2$ and SO$_3$H substituents, Cl groups] | NH$_2$-(CH$_2$)$_3$-N(C$_2$H$_5$)$_2$ |

TABLE I-continued

| Example No. | Triphendioxazine component | Amine |
|---|---|---|
| 20 | (triphendioxazine with SO₃H, NH—(CH₂)₃—NH₂ substituents and H₂N—(CH₂)₃—HN, SO₃H on other side) | NH₂—(CH₂)₃—N(CH₂—CH₂—O—CH₂—CH₂) (morpholine) |
| 21 | (same triphendioxazine core) | NH₂—(CH₂)₃—N(CH₂—CH₂—CH₂—CH₂—CH₂) (piperidine) |
| 22 | (same triphendioxazine core) | NH₂—(CH₂)₂—N(CH₃)₂ |
| 23 | (same triphendioxazine core) | HN(CH₂—CH₂—N(CH₂—CH₂—CH₂—OH)—CH₂—CH₂) (piperazine with hydroxyethyl) |
| 24 | (same triphendioxazine core) | NH₂—(CH₂)₃—N(CH₂—CH₂—CH₂) (azetidine/pyrrolidine) |

TABLE I-continued

| Example No. | Triphendioxazine component | Amine |
|---|---|---|
| 25 | [triphendioxazine with SO₃H, NH–(CH₂)₄–NH₂ substituents and H₂N–(CH₂)₄–HN– on other side] | piperazine-N–CH₂–CH₂–NH₂ |
| 26 | [triphendioxazine with SO₃H, NH–(CH₂)₄–NH₂ and H₂N–(CH₂)₄–HN–] | $H_2N-(CH_2)_3-N(CH_3)_2$ |
| 27 | [triphendioxazine with SO₃H, NH–(CH₂)₄–NH₂ and H₂N–(CH₂)₄–HN–] | $H_2N-(CH_2)_3-N(C_2H_5)_2$ |
| 28 | [triphendioxazine with SO₃H, NH–(CH₂)₄–NH₂ and H₂N–(CH₂)₄–HN–] | piperazine-N–CH₂–CH₂OH |
| 29 | [triphendioxazine with SO₃H, NH–CH₂–CH₂–NH₂ and H₂N–CH₂–CH₂–HN–] | $H_2N-(CH_2)_3-N(CH_3)_2$ |

TABLE I-continued

| Example No. | Triphendioxazine component | Amine |
|---|---|---|
| 30 | H₂N—CH₂—CH₂—HN—(phenyl)—N=(dioxazine with Cl, O)—SO₃H, NH—CH₂—CH₂—NH₂ | HN(CH₂CH₂)₂N—CH₂—CH₂—NH₂ (piperazine) |
| 31 | H₂N—(CH₂)₃—HN—(phenyl)—N=(dioxazine with Cl, O)—SO₃H, NH—(CH₂)₃—NH₂ | HN(CH₂CH₂)₂N—CH₂—CH₂—NH₂ |
| 32 | H₂N—(CH₂)₃—HN—(phenyl)—N=(dioxazine with Cl, O)—SO₃H, NH—(CH₂)₃—NH₂ | HN(CH₂CH₂)₂N—CH₂—CH₂—OH |
| 33 | H₂N—(CH₂)₃—HN—(phenyl)—N=(dioxazine with Cl, O)—SO₃H, NH—(CH₂)₃—NH₂ | NH₂—(CH₂)₃—N(CH₃)₂ |
| 34 | H₂N—CH₂—CH₂—HN—(phenyl)—N=(dioxazine with Cl, O), NH—CH₂—CH₂—NH₂ | NH₂—(CH₂)₃—N(C₂H₅)₂ |

TABLE I-continued

| Example No. | Triphendioxazine component | Amine |
|---|---|---|
| 35 | [2,9-bis(3-aminopropylamino)-substituted triphendioxazine with Cl substituents] | Piperazine: HN(CH₂CH₂)₂NH with N–CH₂–CH₂–NH₂ substituent |
| 36 | [Triphendioxazine with Cl, SO₃H, and NH–CH₂–CH(OH)–CH₂–NH₂ / H₂N–CH₂–CH(OH)–CH₂–NH substituents] | $NH_2-(CH_2)_2-N(CH_3)_2$ |
| 37 | [Triphendioxazine with Cl, SO₃H, and 4-aminocyclohexylamino substituents] | $NH_2-(CH_2)_3-N(CH_2-CH_2OH)_2$ |
| 38 | [Triphendioxazine with OCH₃, SO₃H, and NH–CH₂–CH₂–NH₂ substituents] | $NH_2-(CH_2)_3-N(CH_3)(CH_2-CH_2OH)$ |
| 39 | [Triphendioxazine with SO₃H and NH–CH₂–CH₂–NH₂ substituents] | $NH_2-(CH_2)_3-N(CH_3)(C_2H_5)$ |

TABLE I-continued

| Example No. | Triphendioxazine component | Amine |
|---|---|---|
| 40 | (structure: triphendioxazine with NH—CO—CH₃ and NH—COCH₃ substituents on central rings, SO₃H and NH—(CH₂)₃—NH₂ on one outer ring, H₂N—CH₂—CH₂—HN and SO₃H on the other outer ring) | NH₂—(CH₂)₃—N(C₄H₉)₂ |
| 41 | (structure: triphendioxazine with CH₃ substituents on central rings, SO₃H and NH—CH₂—CH₂—NH₂ on one outer ring, H₂N—CH₂—CH₂—HN and SO₃H on the other outer ring) | 4-(H₂N)C₆H₄—O—CH₂—CH₂—N(C₂H₅)₂ |
| 42 | (structure: triphendioxazine with Br substituents on central rings, SO₃H and NH—CH₂—CH₂—NH₂ on one outer ring, H₂N—CH₂—CH₂—HN and SO₃H on the other outer ring) | NH₂—(CH₂)₃—N(CH₃)₂ |
| 43 | (structure: triphendioxazine with CH₃ substituents on central rings, SO₃H and NH—(CH₂)₃—NH₂ on one outer ring, H₂N—(CH₂)₃—NH and SO₃H on the other outer ring) | NH₂—(CH₂)₃—N(C₂H₅)₂ |

EXAMPLE 44

15.8 g of the dyestuff base of the formula

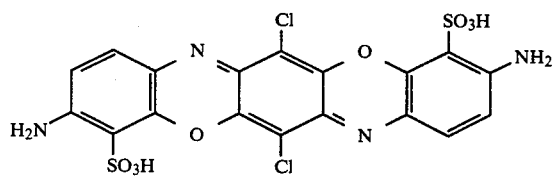

are dissolved in 1,400 ml of water by bringing the medium to pH 7. 1.6 g of an emulsifier prepared from lauryl alcohol and ethylene oxide are added, followed at 20° by 16.4 g of cyanuric chloride in the course of 15 minutes while pH 5.0–5.5 is maintained with 2N sodium carbonate solution. The condensation is complete after about 4 hours, a fine suspension having formed. 40 g of 2-aminoethylpiperazine are added, and the mixture is heated initially at 75° to 80° for 2 hours and then at 90° to 95° for 4 hours. It is allowed to cool down, and the partly precipitated dyestuff is salted out completely with sodium chloride, is filtered off with suction, and is washed with sodium chloride solution.

The product is a dyestuff of the formula (I) in which $R_1$ and $R_2$=Cl, $R_3$=H, m=0, n=1 and $R_5$ and $R_6$=

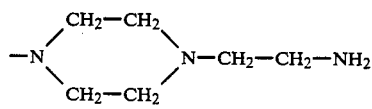

$\lambda_{max}$=617 nm in 5% strength acetic acid.

Paper dyed blue can be obtained with this dyestuff by adding a solution of the product obtained in 10% strength acetic acid to a suspension of bleached pulp, stirring at 20° for 15 minutes, and using the coloured material to produce sheets of paper on a sheet-former. The fact that the waste waters are coloured only to a slight degree is indicative of high degrees of exhaustion. The wet fastness properties of the dye papers are excellent. C.I. indicator number 14.

EXAMPLE 45

10.0 g of the dyestuff base of the formula

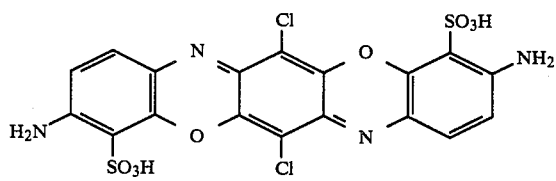

are dissolved at pH 7–8 in 700 ml of water. The solution is added dropwise to a suspension of cyanuric chloride prepared by dissolving 8.2 g of cyanuric chloride in 80 ml of acetone and pouring the resulting solution into 80 ml of ice-water. The reaction mixture is held at a temperature of 0° to 5° and, with 1N sodium carbonate solution, at pH 5.0–5.5. When the reaction has ended after some hours, the precipitated condensation product is filtered off with suction and is added to a mixture of 10.0 g of 3-dimethylamino-1-propylamine and 200 ml of water. The mixture is then heated initially at 45° to 50° for 2 hours and then at 75° to 80° for 5 hours. The solution obtained is cooled down and either the dyestuff is salted out with sodium chloride, filtered off with suction and dried, or the solution obtained is evaporated in vacuo in a rotary evaporator. In either case the product is a dark blue powder, namely a dyestuff of the formula (I) in which $R_1$ and $R_2$=Cl, $R_3$=H, m=0, n=1 and
$R_5$ and $R_6$=—N—CH$_2$—CH$_2$—CH$_2$—N(CH$_3$)$_2$).

EXAMPLE 46

The condensation product of the formula

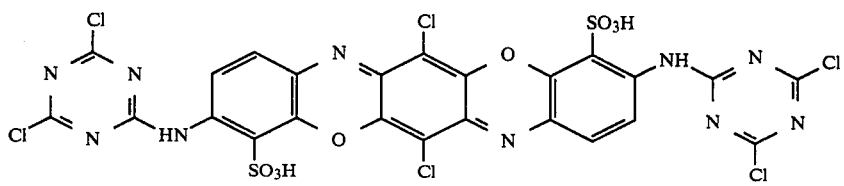

obtained as in Example 45 is isolated as described there and is added to a solution of 15.0 g of 2-hydroxyethylpiperazine in 200 ml of water. The mixture is heated at 60° for 2 hours and then at 95° for 4 hours. When the mixture has cooled down the resulting dyestuff is salted out with sodium chloride, is filtered off with suction, is washed with dilute sodium chloride solution, and is dried.

The product has the formula (I) in which
$R_1$ and $R_2$=Cl, $R_3$=H, m=0, n=1 and
$R_5$ and $R_6$=

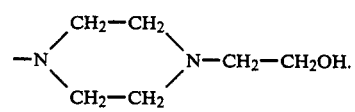

$\lambda_{max}$—578 nm and 629 mn in 5% strength acetic acid.

Paper is dyed from dilute acetic or formic acid solutions in the same way as described in Example 44. C.I. indicator number 14.

Further dyestuffs which dye paper a reddish blue from solutions in diluted weak acids are obtained by condensing the triphendioxazines given in column 2 of Table II with cyanuric chloride in a molar ratio of 1:2 and condensing the resulting intermediates with 4 moles of the amine component of column 3, the result being dyestuffs of the formula (I) in which m=0, n=1 and $R_5$=$R_6$. C.I. indicator number 14.

TABLE II

| Example No. | Triphendioxazine component | Amine component |
|---|---|---|
| 47 | (dioxazine with Cl, SO₃H, NHC₂H₅ groups; C₂H₅NH, SO₃H, Cl on other side) | $NH_2-(CH_2)_3-N(CH_3)_2$ |
| 48 | " | piperazine-$N-CH_2-CH_2-NH_2$ |
| 49 | (dioxazine with Cl, SO₃H, NH–CH₂–CH₂OH; HOCH₂–CH₂–NH, SO₃H, Cl) | $NH_2-(CH_2)_3-N(C_2H_5)_2$ |
| 50 | " | $NH_2-(CH_2)_3-N(CH_2-CH_2OH)_2$ |
| 51 | " | $NH_2-(CH_2)_3-N(CH_3)_2$ |
| 52 | (dioxazine with Cl, SO₃H, NHCH₃; CH₃NH, SO₃H, Cl) | $NH_2-(CH_2)_3-N$(morpholino) |
| 53 | (dioxazine similar, with NHCH₃) | piperazine-$N-CH_2-CH_2NH_2$ |
| 54 | " | piperazine-$N-CH_2-CH_2OH$ |
| 55 | (dioxazine with SO₃H, NHC₂H₅; C₂H₅NH, SO₃H, no Cl) | $NH_2-(CH_2)_3-N(CH_2-CH_2OH)_2$ |
| 56 | (dioxazine with Cl, SO₃H, NH–CH₂–CH₂–OSO₃H; HO₃SO–CH₂–CH₂–NH, SO₃H, Cl) | piperazine-$N-CH_2-CH_2-NH_2$ |
| 57 | (dioxazine with Cl, SO₃H, NH₂; H₂N, SO₃H, Cl) | $NH_2-(CH_2)_3-N$(morpholino) |
| 58 | " | $NH_2(CH_2)_3-N(C_2H_5)_2$ |
| 59 | " | $NH_2-(CH_2)_2-N(CH_3)_2$ |
| 60 | " | $NH_2-(CH_2)_3-N(CH_2-CH_2OH)_2$ |
| 61 | " | $NH_2-(CH_2)_3-N(CH_3)-CH_2-CH_2OH$ |
| 62 | " | piperazine-$N-CH_3$ |

TABLE II-continued

| Example No. | Triphendioxazine component | Amine component |
|---|---|---|
| 63 | " | HN(CH₂CH₂)₂N—C₂H₅ (piperazine ring) |
| 64 | " | $NH_2-(CH_2)_3-N(CH_3)-(CH_2)_3-NH_2$ |
| 65 | " | $NH_2-(CH_2-CH_2-NH)_2-CH_2-CH_2-NH_2$ |
| 66 | " | $NH_2-(CH_2)_2-NH-(CH_2)_2-NH_2$ |
| 67 | " | $NH_2-CH_2-CH_2-N(C_2H_5)_2$ |
| 68 | " | $NH_2-(CH_2)_3-NHCH_3$ |
| 69 | " | $NH_2-(CH_2)_3-N$(homopiperidine ring) |
| 70 | " | $NH_2-CH_2-CH_2-NH-CH_2-CH_2OH$ |
| 71 | " | $NH_2-(CH_2)_6-NH_2$ |
| 72 | " | HN(CH₂CH₂)₂NH (piperazine) |
| 73 | " | $NH_2-CH_2-CH_2-N$(morpholine) |
| 74 | (dibromo triphendioxazine structure) | $NH_2-(CH_2)_3-N(CH_3)_2$ |
| 75 | (dimethyl triphendioxazine structure) | HN(CH₂CH₂)₂N—CH₂—CH₂—NH₂ (N-aminoethylpiperazine) |
| 76 | (triphendioxazine structure) | $NH_2-(CH_2)_3-N(C_2H_5)_2$ |

EXAMPLE 77

12.0 g of a triphendioxazine of the formula

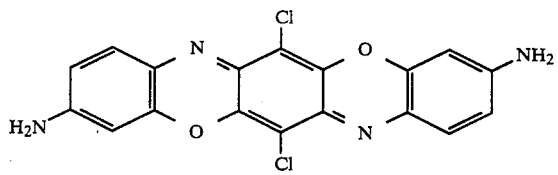

are suspended in 120 ml of dimethylformamide. 10.8 g of cyanuric chloride are added dropwise at 25° in the course of 15 minutes, whereupon the colour of the suspension gradually changes from blue to violet and then to reddish brown. The suspension is stirred for a further 3 hours until the starting dyestuff base has disappeared. A sample of the substance formed will then produce a pure reddish violet solution in warm nitrobenzene. The precipitate formed is filtered off with suction and washed with methanol. After drying in an air stream the condensation product obtained is added to 70 ml of 2-aminoethylpiperazine. The solution is initially stirred at 35° for 3 hours and then at 70° for a further 5 hours. After the condensation has ended the solution is diluted with 15% strength sodium chloride solution, and the precipitated dyestuff is washed with sodium chloride solution and dried.

The product obtained has the formula (I); in which $R_1$ and $R_2=Cl$, $R_3=H$, and m and n=0 and $R^5$ and $R^6=$

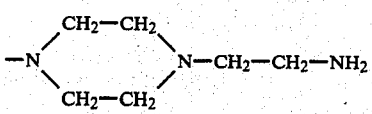

$\lambda_{max}=554$ nm in 5% strength acetic acid.

For dyeing paper, 10 g of the dyestuff obtained are dissolved in 30 ml of acetic acid and 60 ml of water. The ready-to-use solution can be diluted for dyeing as required. The bluish violet dyeings obtained on paper with high degrees of exhaustion have excellent wet fastness properties. C.I. indicator number 12.

EXAMPLE 78

10.6 g of the dyestuff base of the formula

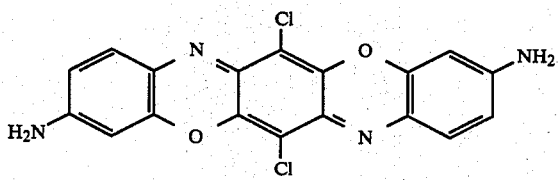

are dissolved/suspended in 100 ml of N-methylpyrrolidone. 7.6 ml of N,N-dimethylaniline are added, followed at 25° by the dropwise addition of 5.3 ml of cyanuric fluoride. After 1 hour the temperature is raised to 45° and the mixture is stirred at said temperature for a further hour. It is cooled down, 300 ml of methanol are added dropwise, the precipitate is filtered off with suction, and the filter cake is washed with methanol. 16.0 g of the condensation product obtained are added to 60 ml of 3-dimethylamino-1-aminopropane in the course of 1 hour during which the temperature is not allowed to exceed 35°, the solution is stirred at 35° to 40° for 3 hours and then at 60° for a further 5 hours. After cooling down, the solution obtained is added dropwise to 800 ml of 20% strength sodium chloride solution, and the precipitated product is filtered off with suction, is washed with sodium chloride solution and, if desired, is dried.

The product is a dyestuff of the formula (I), in which $R_1$ and $R_2=Cl$, $R_3=H$, m and $n=0$ and
$R_5$ and $R_6=-NH-CH_2-CH_2-N(CH_3)_2$
$\lambda_{max}=547$ nm in 5% strength acetic acid.

For dyeing paper, the dyestuff is brought into the protonated form as in Example 77 and the protonated form is used to prepare a ready-to-use solution. Very wet-fresh bluish violet dyeings are likewise obtained on sized and unsized paper. The fact that the waste waters are only slightly coloured is indicative of high degrees of exhaustion. C.I. indicator number 12.

EXAMPLE 79

12.0 g of 3,10-diamino-6,13-dichlorotriphendioxazine are reacted with 10.8 ml of cyanuric fluoride in 120 ml of dimethylformamide in line with the method described in Example 77, and the precipitated condensation product is isolated. This intermediate is added to 75 ml of N-hydroxyethylpiperazine and the reaction mixture is initially heated at 50° to 55° for 30 minutes during which it becomes very thick and then at 80° C. for an additional 2 hours. The mixture is cooled down to 50°, and 250 ml of acetone are then added dropwise. The resulting precipitate is filtered off with suction at 20° and is washed with acetone.

The resulting dyestuff of the formula (I) in which $R_1$ and $R_2=Cl$, $R_3=H$, m and $n=0$ and
$R^5$ and $R^6=$

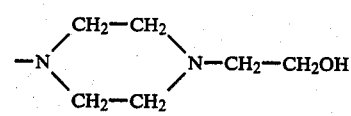

$\lambda_{max}=555$ nm in 5% strength acetic acid can likewise be used for the violet dyeing of paper as described at the end of Example 77. Its application properties are similar to those of the dyestuff described there. C.I. indicator number 12.

EXAMPLE 80

10.0 g of the triphendioxazine of the formula

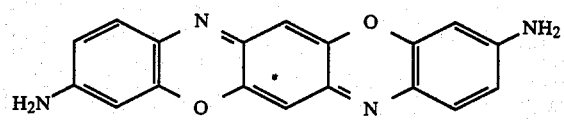

are suspended in 100 ml of dimethylformamide. 9.0 ml of cyanuric fluoride are added dropwise in the course of 10 minutes. The suspension is stirred at room temperature for 1 hour and then at 35° to 40° for 2½ hours. When the suspension has cooled down to 20° the brownish precipitate is filtered off with suction, is washed with methanol and is sucked dry. 17.0 g of the product obtained are added to 100 ml of 1-amino-3-dimethylaminopropane in the course of half an hour during which a mild exothermic reaction occurs. The mixture is then heated to 75° in the course of about 30 minutes, and said temperature is maintained for 2 hours. The resulting solution is cooled down and poured into 2 liters of 25% strength sodium chloride solution. The resulting suspension is filtered with suction, and the filter cake is washed with sodium chloride solution. The product obtained has the formula (I) in which
$R_1$ and $R_2=H$, $R_3=H$, m and $n=0$ and
$R_5$ and $R_6=-NH-(CH_2)_3-N(CH_3)_2$
$\lambda_{max}=549$ nm in 5% strength acetic acid.

For application to paper, the product obtained is dissolved in dilute acetic acid as described in Example 77. The dyestuff dyes paper in somewhat more reddish violet shades than the dyestuff of Example 78 does. C.I. indicator number 12.

EXAMPLE 81

12.0 g of the triphendioxazine component of the formula

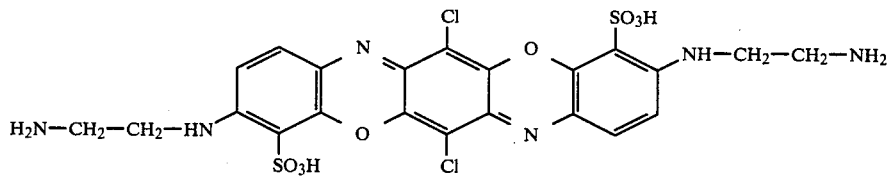

are condensed at 0° to 5° and pH 8.5 in water-acetone with 8.4 g of cyanuric chloride as described in Example 1. After the reaction has ended, the batch is raised to 20° to 25°, and 2.5 g of 2-aminoethanol mixed with 25 ml of water are then added dropwise in the course of 30 minutes during which the pH may be allowed to rise to 9.0 and, after the dropwise addition of the aminoethanol, is maintained between 8.5 and 9.0 by means of 1N sodium hydroxide solution. The condensation is complete after about 3 hours. All of the product is precipitated by adding 25% strength sodium chloride solution, and the precipitate is filtered off with suction and washed with 15% strength sodium chloride solution. The intermediate product obtained has essentially the formula

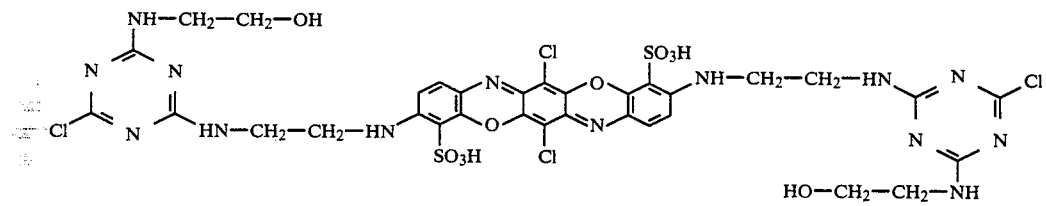

The moist filter cake of the intermediate product is introduced into a mixture of 10.0 g of 2-aminoethylpiperazine and 300 ml of water, and the mixture is heated to 95° to 100° in the course of 30 minutes. 3 hours later the solution is cooled down to room temperature. The product formed is salted out with sodium chloride, is filtered off with suction, and is washed with 20% strength chloride solution.

The dyestuff obtained has the formula (I) where $R_1$ and $R_2$=Cl, $R_3$ and $R_4$=H, A=ethylene, m=1, n=1 and

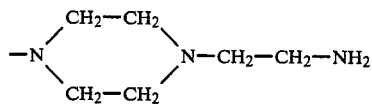

$R_5$=

$\lambda_{max}$=634 nm in 5% strength acetic acid.

Dissolved in dilute acetic acid or formic acid the dyestuff dyes paper in bright blue shades. The dyeings have very good light and wet fastness properties. C.I. indicator number 14.

Further, similar blue dyestuffs are obtained by condensing the bis-dichlorotriazinyl compound first prepared in Example 81 initially with the $R_6$—H amines of Table III in a molar ratio of 1:2 and then with the $R_5$—H amines. C.I. indicator number 14.

TABLE III

| Example No. | $R_6$—H | $R_5$—H@ |
|---|---|---|
| 82 | Diethanolamine | 3-Dimethylamino-1-aminopropane |
| 83 | Diethylamine | 2-Aminoethylpiperazine |
| 84 | Dimethylamine | 2-Diethylamino-1-amino- |

TABLE III-continued

| Example No. | $R_6$—H | $R_5$—H@ |
|---|---|---|
|  |  | ethane |
| 85 | Morpholine | 2-Aminoethylpiperazine |
| 86 | Diethanolamine | 2-Aminoethylpiperazine |
| 87 | Ammonia | 2-Aminoethylpiperazine |
| 88 | Methylamine | 2-Aminoethylpiperazine |
| 89 | Piperidine | 2-Aminoethylpiperazine |
| 90 | 2-Aminoethanol | 2-Aminoethylpiperazine |

EXAMPLE 91

10.0 g of triphendioxazine of the formula

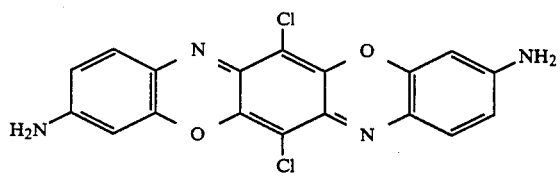

80 ml of nitrobenzene and 12.0 g of cyanuric chloride are heated at 120° C. for 4 hours. When the suspension has cooled down the precipitate is filtered off with suction at 20° and is washed with methanol. 16.0 g of the intermediate product obtained are introduced into 60 ml of 1-amino-3-dimethylaminopropane. The temperature is raised to 74° for 2 hours, and the working up then takes the form described in Example 78, namely the reaction mixture is added to sodium chloride solution. The product obtained has the formula (I) where $R_1$ and $R_2$=Cl, $R_3$=H, m and n=0 and $R_5$ and $R_6$=—NH—$(CH_2)_3$—$N(CH_3)_2$ and is identical to that of Example 78.

EXAMPLE 92

13.5 g of the dyestuff of the formula (VII) where q=2 and $R'_5$=

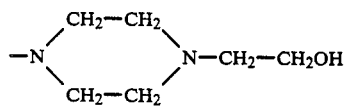

which is obtained in Example 3 are dissolved/suspended at 20° in 150 ml of water. 5.0 ml of dimethyl sulphate are added dropwise, and the reaction mixture is held at pH 8.5–9.0 by means of 1N sodium hydroxide solution.

After 4 hours the suspension obtained is heated at 80° to 85° for 1 hour at the same pH, and is then cooled down to 20°, and the resulting product is isolated by filtering with suction.

The result is a dyestuff of the formula (VII) where $q=2$ and $R_5=$

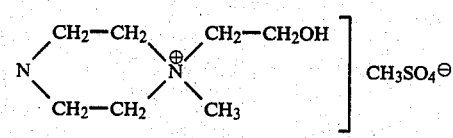

$\lambda_{max}=637$ nm in 5% strength acetic acid
which can likewise be used for the wet-fast dyeing of paper from acid solution. C.I. indicator number 14.

Alternatively, the suspension obtained on cooling down to 20° can also be turned into a solution by adding acetic acid or methanesulphonic acid, and the resulting solution can be directly used for dyeing paper.

EXAMPLE 93

9.0 g of the dyestuff obtained in Example 78 are suspended in 90 ml of water, 0.1 ml of an emulsifier based on lauryl alcohol and ethylene oxide are added, and the suspension is brought to pH 10 by means of 1N sodium hydroxide solution, whereupon it thickens. 6.0 g of dimethyl sulphate are then added dropwise at 25° while pH 9.0–10.0 is continued to be maintained. The batch becomes thinner and finally turns into a solution. The solution is then stirred under the given conditions for 2 hours and is then heated at 80° to 85° for an additional hour.

When there is no longer any detectable sodium hydroxide consumption, the solution is cooled down. It contains a dyestuff of the formula (I) in which
$R_1$ and $R_2=Cl$, $R_3=H$, m and $n=0$, and
$R_5$ and $R_6=$

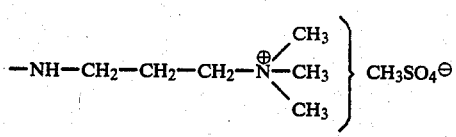

$\lambda_{max}=546$ nm in 5% strength acetic acid.

For practical use, the solution is rendered weakly acid and, if desired, can be concentrated in vacuo. The solution obtained can likewise be used to dye paper bluish violet, exhaustion of the dyestuff onto the paper being virtually complete. C.I. indicator number 12.

The triphendioxazine components listed in column 2 of Table IV can also be condensed with 2 moles of cyanuric chloride analogously to Example 93 and the resulting intermediate product can be reacted with 4 moles of the amine of column 3, the products again being basic dyestuffs which are soluble in weak acids and which are suitable for dyeing paper in the hues given in column 4.

| Example No. | Triphendioxazine component | Amine Component | C.I. indicator number |
|---|---|---|---|
| 94 | Triphendioxazine with SO$_2$NH$_2$, NH$_2$, Cl substituents (symmetric) | NH$_2$—(CH$_2$)$_3$—N(CH$_3$)$_2$ | 13 |
| 95 | Triphendioxazine with SO$_2$NH$_2$, NH$_2$, Cl substituents (symmetric) | Piperazine-N—CH$_2$—CH$_2$—NH$_2$ | 13 |
| 96 | Triphendioxazine with SO$_2$—NH—C$_2$H$_5$, NH$_2$, Cl substituents | NH$_2$—(CH$_2$)$_3$—N(CH$_2$—CH$_2$)$_2$O (morpholine) | 13 |
| 97 | Triphendioxazine with SO$_2$—NH—C$_2$H$_5$, NH$_2$, Cl substituents | NH$_2$—(CH$_2$)$_3$—N(CH$_3$)$_2$ | 13 |
| 98 | Triphendioxazine with SO$_2$N(CH$_3$)$_2$, NH$_2$, Cl substituents | Piperazine-N—CH$_2$—CH$_2$—OH | 13 |

-continued

| Example No. | Triphendioxazine component | Amine Component | C.I. indicator number |
|---|---|---|---|
| 99 | (triphendioxazine with SO₂—CH₃ and NH₂ substituents; H₃C—SO₂ and H₂N on other ring) | NH₂—(CH₂)₃—N(CH₃)₂ | 12 |
| 100 | (triphendioxazine with SO₂—NH—CH₂—CH₂—OSO₃H and NH₂ substituents; HO₃SO—CH₂—CH₂—HN—SO₂ and H₂N on other ring) | NH₂—(CH₂)₃—N(C₂H₅)₂ | 13 |

EXAMPLE 101

12.0 g of the dyestuff of Example 7, which has the general formula (VII), are dissolved/suspended in 100 ml of water. 5.0 ml of dimethyl sulphate are added dropwise while pH 8.5–9.0 is maintained by means of 2N hydroxide solution. After 4 hours the temperature is raised to 50° C. and is maintained for 3 hours and is then raised to 75°–80° C. for an additional hour. When sodium hydroxide solution is no longer consumed, the solution obtained is cooled down to room temperature and is brought to pH 3.5 by means of 7 ml of glacial acetic acid.

The result is a ready-to-use paper-dyeing blue solution of the dyestuff of the formula (VII) where $q=2$ and $R'_5=$

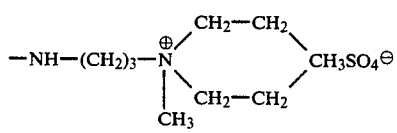

$\lambda_{max}=638$ nm in 5% strength acetic acid. C.I. indicator number 14.

We claim:

1. A triphendioxazine dyestuff of the formula

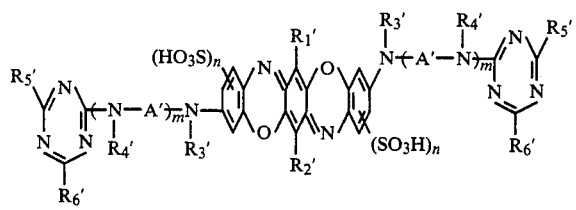

wherein $R'_1$ and $R'_2$ each denote hydrogen or halogen, $R'_3$ and $R'_4$ each denote hydrogen or $C_1$–$C_4$-alkyl which can be substituted by OH or sulphato, A' denotes optionally branched $C_2$–$C_6$-alkylene which can be interrupted by O or S or be substituted by OH or the radicals

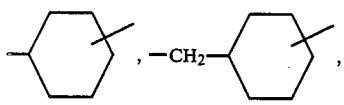

which can be substituted by $C_1$–$C_4$-alkyl, or

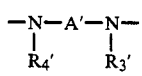

represents optionally $C_1$–$C_4$-alkyl-substitutable piperazine, $R'_5$ and $R'_6$ denote a radical of the formula

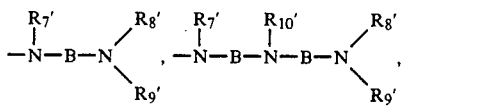

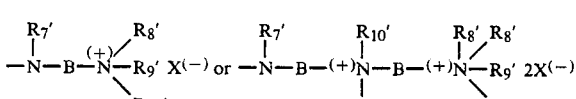

$R'_7$–$R'_{11}$ each denote hydrogen or $C_1$–$C_4$-alkyl which is optionally substituted by hydroxyl, $C_1$–$C_4$-alkoxy, halogen, cyano, $C_1$–$C_4$-alkoxycarbonyl or $C_1$–$C_4$-alkylcarbonyl and $R'_{11}$ also denotes optionally $C_1$–$C_4$-alkyl-, hydroxyl-, $C_1$–$C_4$-alkoxy- and halogen-substituted benzyl or phenylethyl and B denotes $C_2$–$C_6$-alkylene, cyclohexylene, phenylene or an optionally $C_1$–$C_4$-alkyl-substituted radical of the formulae

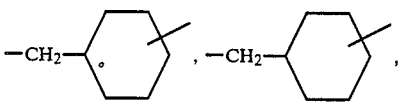

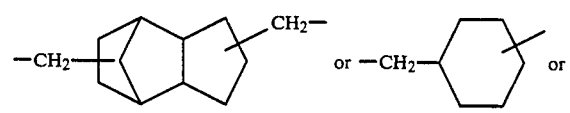

represents an optionally $C_1$–$C_4$-alkyl-substituted piperazine or imidazlidine ring, or $R'_8$—N—$R'_9$ signifies an optionally $C_1$–$C_4$-alkyl-substituted piperidine, morpholine, piperazine or pyrrolidine ring or

signifies an optionally $C_1$–$C_4$-alkyl-substituted pyridinium radical, $X^{(-)}$ signifies an anion, m denotes 0 or 1 and n denotes 0 or 1.

2. A triphendioxazine dyestuff according to claim 1, wherein $R'_1$ and $R'_2$ each represent chlorine, $R'_3$ and $R'_4$ each represent hydrogen or $C_1$–$C_4$-alkyl.

3. A triphendioxazine dyestuff according to claim 1 of the formula

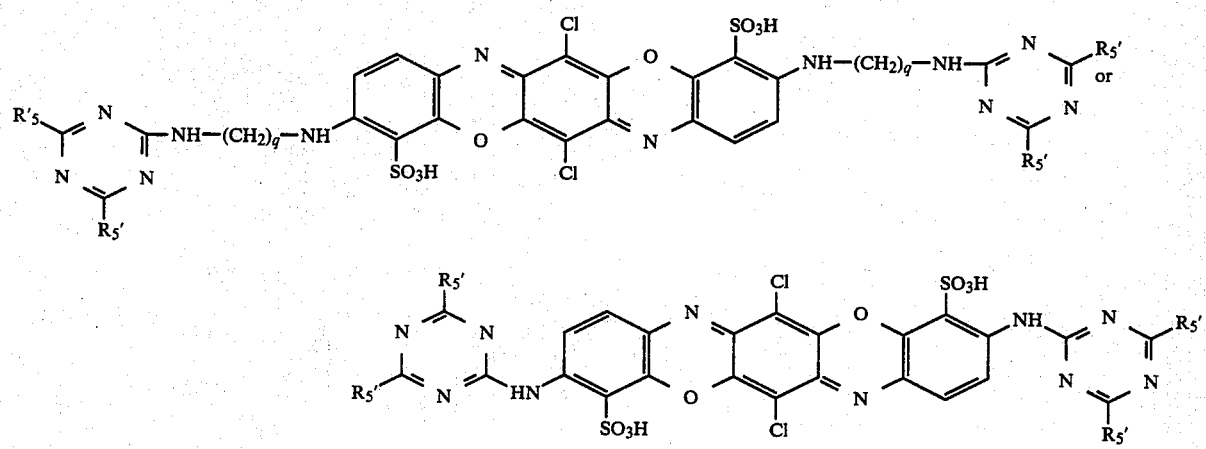
wherein
q represents 2, 3 or 4.
4. A riphendioxazine dyestuff according to claim 3 where
R′₅ represents
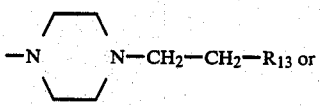
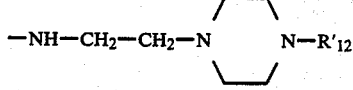
and the ammonium compounds of these amines obtained by quaternisation with R″₁₁-X,
with R″₁₁ and R′₁₂ each represent hydrogen, methyl or ethyl,
$R_{13}$ represents OH or $N(R'_{12})_2$ and
X represents a radical $X^{(-)}$ which is detachable in the form of the anion $X^{(-)}$.
* * * * *

UNITED STATES PATENT AND TRADEMARK OFFICE
CERTIFICATE OF CORRECTION

PATENT NO. : 4,568,742
DATED : February 4, 1986
INVENTOR(S) : Wolfgang Harms, et al.

It is certified that error appears in the above-identified patent and that said Letters Patent is hereby corrected as shown below:

Abstract, line 2      Delete beginning of formula and substitute:

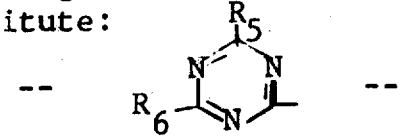

Col. 5, lines 53-60 and Col. 48, lines 6-15      Delete formulas and substitute:

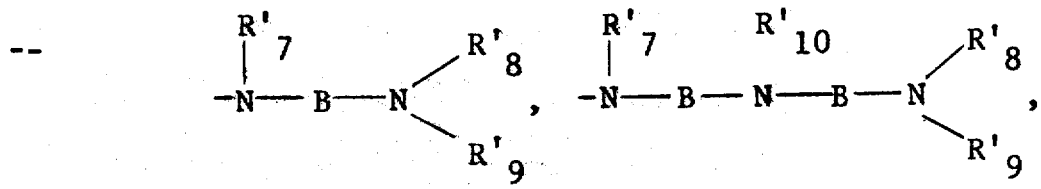

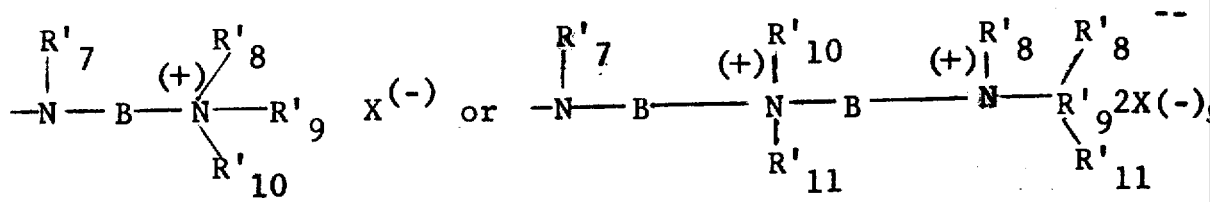

Col. 11, line 54      Delete "introducted" and substitute --introduced--

Col. 11, line 65      End of line delete "-N$_{(3)2}$" and substitute -- -N(CH$_3$)$_2$ --

Col. 32, line 20      After "R$_6$-" delete "-N-" and substitute -- -NH--

Col. 37, line 58      Delete "wet-fresh" and substitute --wet-fast--

UNITED STATES PATENT AND TRADEMARK OFFICE
CERTIFICATE OF CORRECTION

PATENT NO. : 4,568,742

DATED : February 4, 1986

INVENTOR(S) : Wolfgang Harms, et al.

It is certified that error appears in the above-identified patent and that said Letters Patent is hereby corrected as shown below:

| | |
|---|---|
| Col. 38, line 12 | Delete "$R^5$" and substitute --$R_5$-- |
| Col. 39, line 48 | Beginning of formula delete "-N$<$" and substitute --$R_5$=N$<$-- |
| Col. 39, line 51 | Delete "$R_5$" |
| Col. 40, line 63 | Beginning of formula delete "-N$<$" and substitute --N$<$-- |
| Col. 47, line 35 | In formula; in two instances each, delete "$R_5$'" and substitute --$R'_5$--, delete "$R_6$'" and substitute --$R'_6$--; delete "$R_4$'" and substitute --$R'_4$--, delete "$R_3$'" and substitute --$R'_3$--. In one instance each delete "$R_1$'" and substitute --$R'_1$--, delete "$R_2$'" and substitute --$R'_2$--. |
| Col. 47, line 65 | Delete formula and substitute $$-\underset{R'_4}{\overset{|}{N}}-A'-\underset{R'_3}{\overset{|}{N}}-$$ |
| Col. 48, line 23 | Delete "and" before "halogen" and substitute --or-- |
| Col. 48, line 43 | In two instances each delete "$R_7$'", "$R_8$'" and "$R_{10}$'" and substitute |

UNITED STATES PATENT AND TRADEMARK OFFICE
CERTIFICATE OF CORRECTION

PATENT NO. : 4,568,742

DATED : February 4, 1986

INVENTOR(S) : Wolfgang Harms, et al.

It is certified that error appears in the above-identified patent and that said Letters Patent is hereby corrected as shown below:

$$--R'_7--, \quad --R'_8-- \text{ and } --R'_{10}--.$$

| | |
|---|---|
| Col. 48, line 46 | Correct spelling of --imidazolidine-- |
| Cols. 49-50, lines 1-15 | In formula in eight instances delete "$R_5$'" and substitute --$R'_5$-- |
| Col. 50, line 28 | Beginning of line delete "with" before "$R_{11}$". |

Signed and Sealed this

Sixteenth Day of September 1986

[SEAL]

Attest:

DONALD J. QUIGG

Attesting Officer

Commissioner of Patents and Trademarks